(12) United States Patent
Toulmay

(10) Patent No.: US 7,461,548 B2
(45) Date of Patent: Dec. 9, 2008

(54) METHOD AND A DEVICE FOR MEASURING THE SPEED OF AN AIRCRAFT, IN PARTICULAR A ROTORCRAFT AT LOW SPEED

(75) Inventor: François Toulmay, Vitrolles (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/835,450

(22) Filed: Aug. 8, 2007

(65) Prior Publication Data

US 2008/0034860 A1 Feb. 14, 2008

(30) Foreign Application Priority Data

Aug. 9, 2006 (FR) .................................. 06 07239

(51) Int. Cl.
*G01W 1/00* (2006.01)

(52) U.S. Cl. ................................. 73/170.02; 73/170.01

(58) Field of Classification Search .. 73/170.01–170.16
See application file for complete search history.

(56) References Cited

U.S. PATENT DOCUMENTS

| 3,318,146 | A | | 5/1967 | De Leo et al. |
| 3,373,605 | A | | 3/1968 | Beilman |
| 4,096,744 | A | | 6/1978 | De Leo et al. |
| 5,025,661 | A | * | 6/1991 | McCormack ................. 73/180 |
| 5,319,970 | A | * | 6/1994 | Peterson et al. ............... 73/182 |
| 5,331,849 | A | * | 7/1994 | Hedberg et al. ............... 73/182 |
| 5,616,861 | A | * | 4/1997 | Hagen ......................... 73/180 |
| 6,609,421 | B2 | * | 8/2003 | Cronin et al. ............ 73/170.02 |

FOREIGN PATENT DOCUMENTS

| EP | 0 319 447 | 6/1989 |
| FR | 2 688 314 | 9/1993 |

* cited by examiner

*Primary Examiner*—Edward Lefkowitz
*Assistant Examiner*—Jermaine Jenkins
(74) *Attorney, Agent, or Firm*—Young & Thompson

(57) ABSTRACT

A method and a device for obtaining the three components (u,v,w) of the air speed (TA) of an aircraft along its flight path, the device including an arm (2) provided with two pressure probes disposed at each of its ends, each probe having two pressure intakes.

26 Claims, 3 Drawing Sheets

METHOD AND A DEVICE FOR MEASURING THE SPEED OF AN AIRCRAFT, IN PARTICULAR A ROTORCRAFT AT LOW SPEED

The present invention relates to a method and to a device for determining the speed of an aircraft relative to the surrounding air, and in particular the speed of a rotorcraft such as a helicopter, for example, having at least one main rotor, i.e. a set of blades rotating about a substantially vertical axis for providing said helicopter with lift and propulsion.

BACKGROUND OF THE INVENTION

More precisely, the invention proposes a measuring instrument, also known as an air speed indicator (ASI) suitable for providing on-board instruments with information about the performance of the aircraft, and specifically its speed, in a manner that is as accurate as possible, in particular when the aircraft is traveling at low speed.

To do this, the invention also provides a method of processing information from said measuring instrument enabling the speed of the aircraft relative to the air to be obtained, also known as "aerodynamic speed", "true air speed", or indeed "flight path air speed".

It is recalled that an ASI is generally a differential pressure gauge measuring the difference between static pressure (or ambient pressure) that is independent of speed, and the pressure that is given by an intake for total air pressure, which intake is known as a "Pitot tube" by the person skilled in the art. In principle, the static pressure intake and the total pressure intake are grouped together in a single pressure probe, also known as a "Pitot probe" or a "Pitot head", that is of substantially streamlined and cylindrical shape, with a generally hemispherical anterior portion placed on the aircraft in such a manner that firstly the total pressure intake is situated at the extreme upstream point of the cylindrical body (known as the stagnation point when the axis of the cylinder is parallel to the incident air stream upstream from said stagnation point), and secondly the static intake is radial and behind the total pressure intake.

Thus, and in application of Bernoulli's theorem (which holds good up to about 300 kilometers per hours (km/h), beyond which Saint-Venant's equations apply, or indeed Lord Rayleigh's in the supersonic range), the above-mentioned pressure difference is equal to the dynamic pressure from which the indicated air speed $V_i$ of the aircraft along the axis of the cylindrical body of said probe is deduced. The probe is connected to an on-board instrument, i.e. an indicator constituting an ASI such that the indicated speed corresponds:

on the ground, to the speed of the aircraft relative to the surrounding atmosphere; and in the air (in flight) to the equivalent speed, i.e. the product of the speed multiplied by the square root of the relative density of the air, itself equal to the quotient of the density of the air at the altitude in question divided by the density of air at ground level in a "standard atmosphere".

When the atmosphere on a particular day differs significantly from the standard atmosphere, a correction is included based on "altitude density" that need not be described herein.

However, in fact, the indicated speed $V_i$ differs from the equivalent speed because the instrument is not made perfectly (instrumental error associated in particular with making the static intake) and because the static intake does not give exactly the static pressure at infinity as would be appropriate. The static pressure is the pressure that would be measured by a probe without any speed relative to the air, and it is also necessary to distinguish local static pressures (a function of the flow of air around the aircraft or pressure field) and the static pressure of the surrounding air in the absence of any interaction, known as the "static pressure at infinity", it being understood that this is the pressure that ought to be measured by the ASI installation.

It can thus readily be understood that developing and using an ASI is difficult, requiring special corrections and calibrations.

Furthermore, it is important to observe that traditional devices (ASI with Pitot tube and static pressure intake) have sensitivity that tends to become zero when the speed of the aircraft relative to the air becomes small.

Furthermore, and as mentioned above, the calibration of such devices leads to a single speed value being given, i.e. the speed along the axis of the cylinder of the Pitot probe. Consequently, the speed of the aircraft is assumed to be said single value: no account is taken neither of the exact value of the modulus of the air speed vector along the flight path, nor of its direction in three-dimensional space.

Finally, and in the special circumstance of rotorcraft, such aircraft can execute three possible types of flight:

vertical flight, up or down;

stationary flight or hovering, when the aircraft does not move relative to the air; and flight in translation, whether horizontally or inclined.

In the range of flight close to hovering, the existence of vertical and lateral components in the flight path air speed can induce angles of incidence and of side-slip between the flight path air speed vector and the rotorcraft that can reach large values, making the air speed indicated by such traditional devices badly wrong.

With rotorcraft, the wash from the rotor(s) also disturbs indications in this portion of the flight envelope.

Because of these phenomena, limitations are put on the use of rotorcraft in order to guarantee safety, with the corresponding reduction in the utilization and the performance of such aircraft.

Consequently, in order to avoid loss of sensitivity, certain helicopters are fitted with two Pitot tubes placed on two opposite arms of a rotary antenna centered on the axis of rotation of the main rotor, above the plane of the blades. That device is known as an omnidirectional air data system and is used for example on military helicopters such as the Bell UH60 helicopter or indeed an analogous device is implemented on the Dauphin™ Coast Guard helicopter developed by the Applicant.

The MI28 helicopter uses Pitot tubes placed directly at the ends of the blades.

Those two devices present sensitivity that is more or less constant, including at low speed, and they can provide the two components of air speed in the plane of rotation of said device, to the exclusion of the third component that is orthogonal to said plane of rotation.

In contrast, those devices cannot be used on civilian rotorcraft because of their complexity and their cost.

Under such conditions, U.S. Pat. No. 3,373,605 presents a device mounted on an arm that rotates at constant speed, thus constituting a rotating antenna, and fitted at each end with a total pressure intake or Pitot tube. That device enables the absolute value of relative speed to be measured in the plane of rotation of the antenna between said device and the incident air stream, and also makes it possible to measure the direction of that air stream in said plane. The pressure difference between the two total pressure intakes is a periodic function having amplitude that is proportional to the modulus of said relative speed. In practice, the relative speed is obtained directly from the maximum value of the pressure difference. Side-slip is calculated from pressure difference values measured at "points" that are spaced apart orthogonally. No information on a possible relative speed component normal to the plane of rotation of the device can be determined.

U.S. Pat. No. 3,318,146 relates to a device for measuring the speed and the angle of inclination of a flow by means of a probe having at least five orifices, acting as pressure intakes and placed on the surface of a sphere in a special manner. As a result, that device enables the Mach number of the flow to be obtained together with information concerning the orientation of the speed vector, in particular by making use of experimental curves. Consequently, that equipment cannot satisfy the need for an aircraft air speed indicator, in particular when the aircraft is a rotorcraft flying at low speed. It is recalled that Mach number corresponds to the speed of a vehicle divided by the speed of sound. The speed of sound is proportional to the square root of the absolute temperature of a fluid, specifically the air at the probe, so the use of the device in question makes it necessary, at least in particular, to use an additional probe to measure temperature and appropriate processor means. Such a device is necessarily expensive and not sufficiently reliable because of the coupling between the above-mentioned means and the use of empirical results (experimental curves). In addition, the sensitivity of that device tends towards zero as the speed of the aircraft decreases.

In an attempt to provide a solution to the problem of obtaining the speed of a helicopter, document FR-2 282 644 describes a device for determining speed components in a plane parallel to the rotor plane during flying stages close to hovering conditions. That device performs said function via two measurement systems associated with the pitch cyclic control system of the rotor under the control of a control stick, having a first detector for detecting the position of the rotor pitch cyclic control along the transverse axis, and a second detector for detecting the component of acceleration along the longitudinal axis, together with calculation means, associated with said detectors, to integrate the algebraic sum of the values measured by the two corresponding detectors relative to each of the above-mentioned axes.

Document FR-2 565 270 relates to an improvement of the above document that differs by the fact that it includes, in each of the two measurement systems, a single detector (specifically an accelerometer) for detecting the position of the rotor pitch cyclic control relative to the axis in question and the acceleration component along the same axis, together with calculation means serving to integrate the output signal from the single detector of each measurement system so as to provide the speed components of the helicopter relative to air and relative to the axes in question.

The devices disclosed in the two above documents do not enable all three components of the flight path air speed vector to be obtained, but only the longitudinal and transverse components.

Document FR-2 688 314 describes determining the two components of the air speed in the plane of the rotor in accordance with document FR-2 565 270, and teaches certain novel dispositions that enable the vertical component of the speed of the helicopter relative to the surrounding mass of air to be determined when said speed is small, with this being done solely by using internal measurement means, i.e. the position of the lift rotor controls (using accelerometers), the speed of rotation of the rotor, and the three components of acceleration in the cabin. Those dispositions are applied to certain mass-produced helicopters and do indeed provide information that is useful for the pilot and that is used by on-board systems, but nevertheless with accuracy that is limited by the fact that the accuracy of the pendular system (according to document FR-2 282 644 only) and the actual principles used for determining speed (see documents FR-2 282 644, FR-2 565 270, and FR-2 688 314): direct aerodynamic measurement is not involved, rather indirect identification via the response of the aircraft to said speed based on a very rudimentary mechanical model of helicopter flight. Even if the model takes account of changes in the configuration of the helicopter, it ignores the influence of numerous parameters such as the non-uniformity of the flow of air around the rotor, the number of blades, the shape of the blades, the kinematics of the hub, . . . . Those simplifying assumptions lead to errors concerning the calculated values of the speed components, which errors can be cumulative and can become very large, thereby limiting the representivity of the results. Furthermore, that device (see document FR-2 282 644) requires the zero setting system to be calibrated frequently, since otherwise there is a danger of losing accuracy at low speed. Consequently, that type of system does not make it possible to do without an ASI of the usual type, since it cannot be calibrated for high speeds, and it does not make it possible to cover the entire flight envelope of the aircraft. Thus, none of the known dispositions provides a satisfactory solution to the need.

OBJECTS AND SUMMARY OF THE INVENTION

An object of the present invention is to remedy those drawbacks and to propose a method and a device capable of measuring the three components of the flight path air speed of an aircraft that can hover or move in any direction, in particular when maneuvering at low speed.

According to the invention, the method of obtaining the three components $\underline{u}$, $\underline{v}$, and $\underline{w}$ of the flight path air speed TA of an aircraft in a non-rotary rectangular frame of reference (x,y,z) has the following steps:

measuring air pressure via at least four pressure intakes, comprising first and second groups of two pressure intakes each, disposed respectively at each of first and second pressure probes interconnected by an arm rotating at a constant speed of rotation $\Omega$ about its center such that for each probe, the two corresponding pressure intakes are at the same distance from the center of rotation of the arm and disposed symmetrically about the plane of rotation of said arm, also being situated on the advancing side of the arm;

converting the four pressure measurements into four corresponding electric signals;

establishing a first magnitude by adding the electric signals obtained from the two pressure intakes disposed above the plane of rotation and by subtracting the electric signals obtained from the two pressure intakes disposed below said plane of rotation;

establishing a second magnitude by adding the electric signals obtained from one of the two pressure probes and by subtracting the pressure signals obtained from the other pressure probe;

using a Taylor/MacLaurin series development of the theoretical expression for the tangential speed of the air in register with each pressure intake and retaining only first order terms, thereby obtaining firstly a first expression representative of the first magnitude and secondly a second expression representative of the second magnitude;

since the first expression is proportional to $\underline{w}$, and the other terms are known, $\underline{w}$ can be deduced therefrom by identifying said first expression with the first magnitude, said operation being performed by harmonic analysis synchronized on the speed of rotation of the arm using a synchronization signal, such that the mean value of the first magnitude provides $\underline{w}$ on the basis of knowledge of the one-to-one relationship between said mean value and $\underline{w}$ as obtained by prior calibration;

the second expression is a time periodic function of angular frequency corresponding to the constant speed of rotation $\Omega$ of the arm and it depends linearly on two periodic components of the flight path air speed $v_t$ and $v_r$ along two orthogonal axes, respectively $\underline{t}$, and $\underline{r}$, contained in said plane of rotation and respectively normal and radial relative to said arm, such that from said harmonic analysis synchronized on the speed of rotation of the arm, the components $\underline{u}$ and $\underline{v}$ are obtained as a function of previously established corresponding calibration.

Furthermore, in a first variant of the method, the signal of the first magnitude is obtained as follows:

the electric signal from the pressure intake above said plane of rotation in the first pressure probe is transmitted to two combiner members and given a positive sign;

the electric signal from the pressure intake above said plane of rotation from the second pressure probe is transmitted to the two combiner members and given a positive sign by the first combiner member and a negative sign by the second combiner member;

the electric signal from the pressure intake beneath said plane of rotation from the first pressure probe is transmitted to both combiner members and is given a negative sign by the first combiner member and a positive sign by the second combiner member; and the electric signal from the pressure intake beneath said plane of rotation of the second pressure probe is transmitted to both combiner members given a negative sign.

Whereby, the first combiner, after summing, delivers the signal representative of the first magnitude. In analogous manner, the second combiner, after summing, delivers the signal representative of the second magnitude.

A second variant of the method enables the first and second magnitude signals to be obtained as set out below:

the pressures at the pressure intakes above said plane of rotation, in the first and second pressure probes, are transmitted to a first pressure sensor that measures a first differential pressure between said pressure intake of the first pressure probe and said pressure intake of the second pressure probe, said first pressure sensor delivering an electric signal representative of said first differential pressure;

the pressures at the pressure intakes in the first pressure probe are transmitted to a second pressure sensor that measures a second differential pressure between the pressure measured by the pressure intake above said plane of rotation and the pressure measured by the pressure intake below said plane of rotation, said second pressure sensor delivering an electric signal representative of said second differential pressure;

the pressures of the pressure intakes in the second pressure probe are transmitted to a third pressure sensor that measures a third differential pressure between the pressure measured by the pressure intake above said plane of rotation and the pressure measured by the pressure intake below said plane of rotation, and the third pressure sensor delivers a signal representative of said third differential pressure; and the pressures at the pressure intakes below said plane of rotation in the first and second pressure probes are transmitted to a fourth pressure sensor that measures a fourth differential pressure between said pressure intake of the first pressure probe and said pressure intake of the second pressure probe, said fourth pressure sensor delivering an electric signal representative of said fourth differential pressure.

Under such conditions, the following are obtained:

the signal representative of the first magnitude by adding the signals representative of the second and third differential pressures in a first summing circuit; and the signal representative of the second magnitude by adding the signals representative of the first and fourth differential pressures in a second summing circuit.

Naturally, the various electric signals (signals derived from pressures, electric signals representative of the first and second magnitude) may be electric signals that are in analog or digital form.

Advantageously, in the event of a possible phase shift, as determined during calibration of the probe, between the probe facing the direction of the speed vector and the maximum value of the electric signal representative of the second magnitude, this effect is compensated by offsetting the phase of the synchronization signal.

Also advantageously, this phase shift can be compensated by using a rotation matrix applied to the components supplied by harmonic analysis.

Furthermore, the invention also provides a device for measuring the three components $\underline{u}$, $\underline{v}$, and $\underline{w}$ of the flight path air speed TA of an aircraft that is capable of hovering or of moving in all directions, in particular when maneuvering at low speed.

The device is remarkable in that:

it comprises an arm orthogonal at its center to a drive shaft rotating a constant speed of rotation, said arm carrying a respective pressure probe at each of its ends;

each pressure probe is symmetrical relative to the plane of rotation, having a streamlined anterior portion situated on the advancing side of said arm, said anterior portion having at least two pressure intakes disposed symmetrically about said plane of rotation and lying in a plane of symmetry of said pressure probe orthogonal to said arm;

each pressure intake is connected to at least one pressure sensor that converts the pressure measurement into an electric signal;

it comprises processor means for processing said electric signals to establish the values of a first magnitude and of a second magnitude; and it comprises a harmonic analyzer coupled to a synchronizer relative to the speed of rotation of the arm, generating firstly the mean component of the first magnitude, and providing the component $\underline{w}$ on the basis of prior calibration, and secondly the first order components respectively in phase and in phase quadrature of the second magnitude so as to provide the two respective components $\underline{u}$ and $\underline{v}$, taking account of previously-established calibration.

Under such conditions, the sensitivity of the device remains practically constant, including when traveling at the slowest speeds without wind of the aircraft, in particular a helicopter. In this way, the pilot can make full use of the capacities of the aircraft while still being warned of approaching flying conditions that might present risks, such as, for example, special unsafe conditions such as "height-speed" or indeed "vortex state" (or "turbulent ring"), in particular because of the local characteristics of the wind to which a helicopter is subjected.

The length of the rotating arm between its two ends is advantageously short, preferably less than 0.2 m. Furthermore, its speed of rotation maintained by a motor is kept constant so that the driven speed of each pressure probe is much greater than the greatest flight path air speed to be measured, and is not less than 50 meters per second (m/s).

In addition, the angular position of the arm relative to the rectangular frame of reference (x,y,z) is known continuously because of the appropriate synchronization signal given by a phonic wheel, an angle encoder, or any other equivalent means.

In a first embodiment of the device, each pressure probe has anterior and posterior end portions that are substantially hemispherical and interconnected by a shell that is substantially cylindrical, having its axis of symmetry orthogonal to said arm and contained in the plane of rotation, and being of section that is substantially circular.

In a preferred second embodiment of the device, each pressure probe has inner and outer end portions that are substantially hemispherical interconnected by a shell that is substantially cylindrical having its axis coinciding with that of the arm and contained in the plane of rotation, and of section that is substantially circular.

In a third embodiment, each pressure probe is substantially spherical.

Naturally, the shapes given to each pressure probe in each of these three embodiments are designed to avoid any disturbance to the flow of air past the pressure intake, which would not be true if angular shapes were to be used.

In each of those embodiments, the pressure intakes of each probe are oriented in a direction passing through the center of the anterior portion marking the center of the circle contained in the plane of symmetry orthogonal to the arm, at an angle $a$ lying either in the range 25° to 35° relative to the plane of rotation, or else in the range 55° to 70° relative to the plane of rotation.

An additional and substantial advantage of the device of the invention consists in pneumatically connecting each pressure intake to a miniature pressure sensor disposed in the corresponding pressure probe. Each sensor then delivers an electric signal in analog or digital form that is representative of the measured pressure. Under such circumstances, the pneumatic connection is embodied in the form of a very short duct or is even direct if the sensor is disposed at the pressure intake itself.

It should be observed that each sensor then measures the local pressure and that this first disposition corresponds to the first variant of the method implemented by said device.

A second possibility corresponds to using four pressure sensors disposed either all in the central portion formed by the arm and the drive shaft, substantially at equal distances from both pressure probes, or else in such a manner that one pressure sensor is disposed in each pressure probe, while the other two are in said central portion. In addition, each sensor is connected to two pressure intakes and then measures a differential pressure.

This second disposition corresponds to the second variant of the method implemented by said device.

Naturally, the output signal from each sensor varies cyclically because of the rotation of the arm.

The use of the device of the invention naturally assumes that the surrounding air is uniform in the small volume swept by the rotating arm and that the speed of the device relative to the air varies very little during one revolution of said arm, which requires the arm to rotate at a speed that is sufficiently fast.

BRIEF DESCRIPTION OF THE DRAWINGS

The invention and its advantages appear in greater detail in the context of the following description of preferred embodiments, given without any limiting character, and described with reference to the accompanying figures, in which.

Elements present in more than one of the figures are given the same reference in all of them.

MORE DETAILED DESCRIPTION

Figure 9:
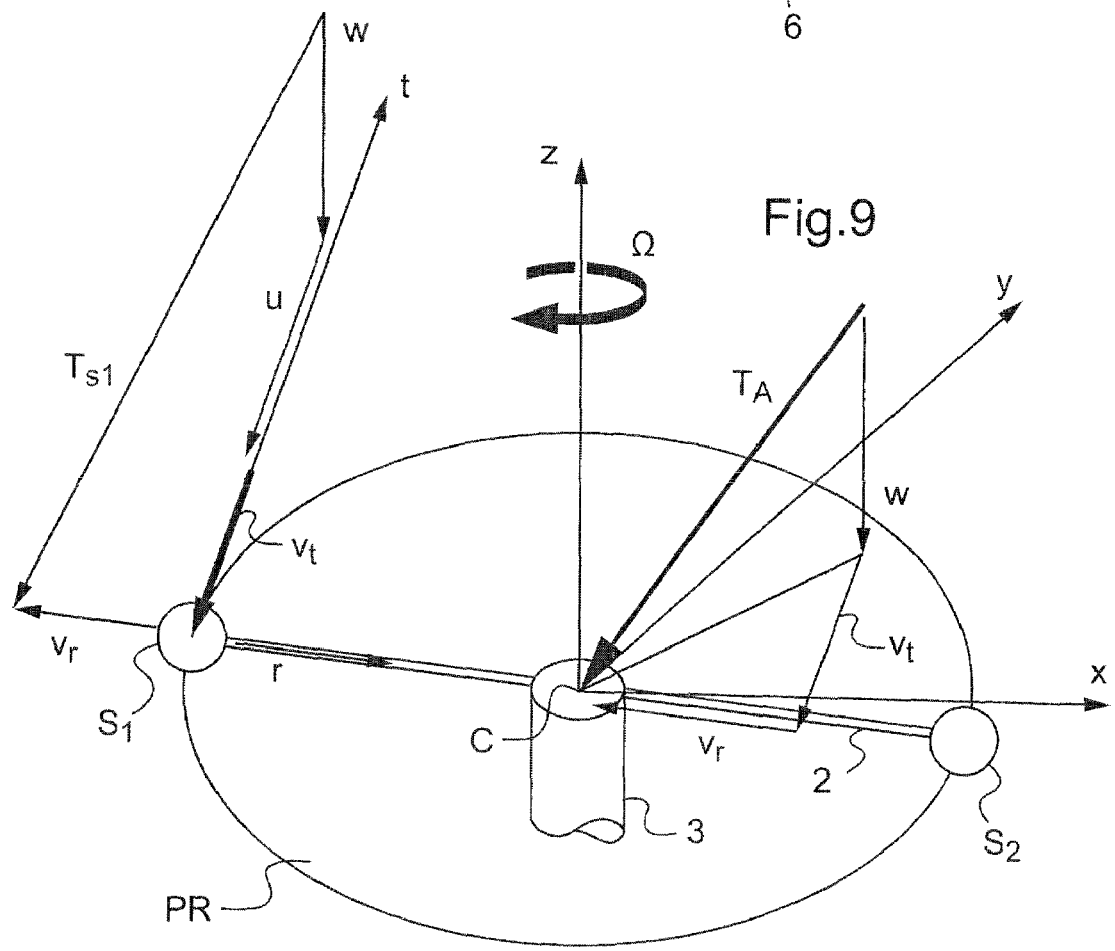
FIG. 9 is a perspective view of the velocity diagram relating to the device and the method of the invention.

In general, FIGS. 1 to 5 show direction axes, also made explicit in FIG. 9, so as to specify a non-rotating rectangular frame of reference (x,y,z) and a local rotating rectangular frame of reference (r,t,z).

Figure 1:
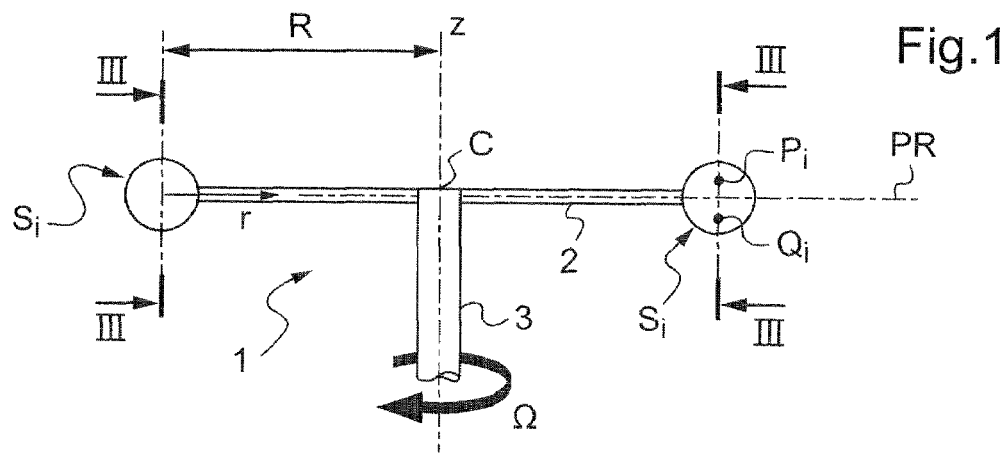
FIG. 1 is a face view of a first embodiment of the device of the invention.

Under such conditions, FIG. 1 shows the mechanical portion of the device 1 of the invention which is in the form of an arm 2, orthogonally connected at its center C to a drive shaft 3 extending along the $\underline{z}$ axis, and rotating at a constant speed of rotation $\Omega$.

The $\underline{x}$ and $\underline{y}$ axes are contained in the plane of rotation PR of the rotary arm.

At each of its ends, the arm has a pressure probe $S_i$, where the index $\underline{i}$ is equal to 1 or 2 and identifies each of the pressure probes relative to the other.

Figure 2:
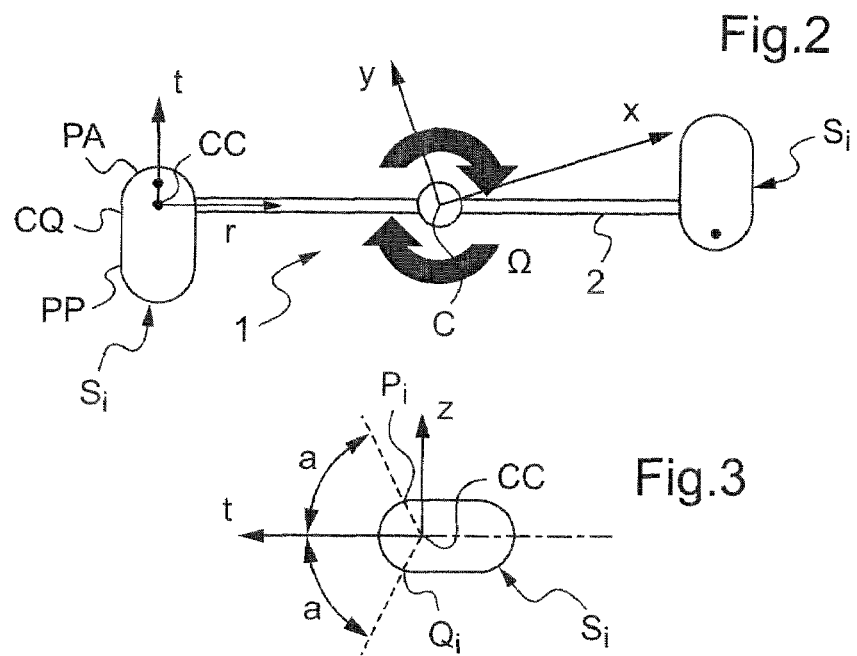
FIG. 2 is a plan view of the device constituting the first embodiment.

FIG. 2 shows the device in plan view, and more particularly the relative positions of the reference axes $\underline{x}$ and $\underline{y}$ relative to the local axes $\underline{r}$ and $\underline{t}$, associated with the pressure probe.

Figure 3:
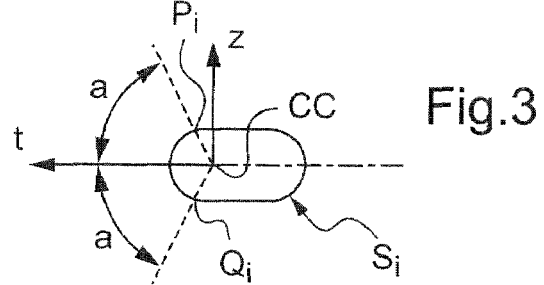
FIG. 3 is a section view of a pressure probe on line III-III in FIG. 1.
Figure 4:
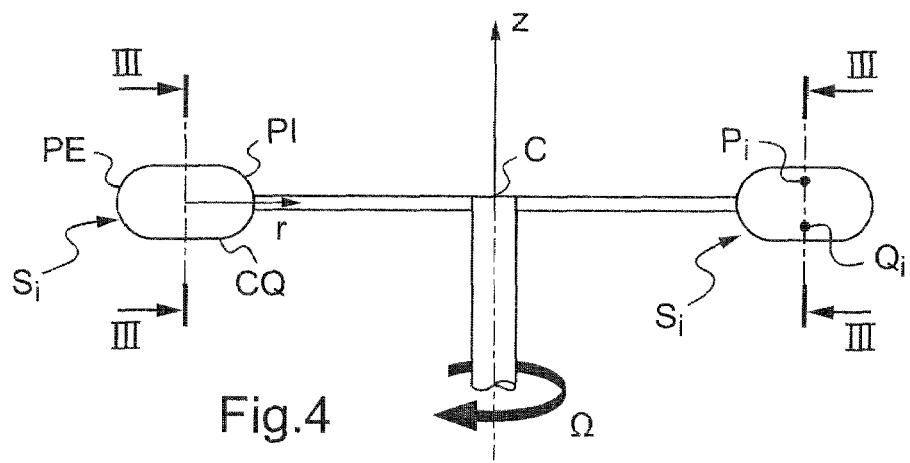
FIG. 4 is a face view of a second embodiment of the device of the invention.

Each pressure probe is symmetrical relative to the plane of rotation PR, with a streamlined anterior end portion situated on the advancing side of said arm, as shown in FIGS. 2 and 3.

FIG. 3 in particular indicates that this anterior extreme portion has two pressure intakes referenced $P_i$ and $Q_i$ (index $\underline{i}$ identical to the index of $S_i$), that are disposed symmetrically about the plane of rotation PR and that are disposed in the plane of symmetry (z,t) of each pressure probe, said plane naturally being orthogonal to the arm 2. It is understood below that the pressure intakes $P_i$ and $Q_i$ are disposed respectively above and below the plane of rotation PR.

In a first embodiment of the device (FIGS. 1 to 3), each pressure probe $S_i$ is substantially cylindrical (as shown in FIGS. 2 and 3) such that it presents anterior and posterior end portions PA and PP that are substantially hemispherical interconnected by a central shell CQ that is substantially cylindrical with its axis of symmetry being orthogonal to said arm 2 and contained in the plane of rotation PR, and with its section being substantially circular.

Figure 5:
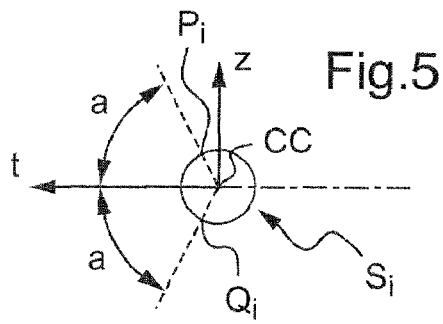
FIG. 5 is a section view of a pressure probe, firstly on axis III-III of FIG. 4, and secondly constituting a third embodiment having a face view that is identical to that of FIG. 1 (the section then being on line III-III of FIG. 1)

In a second embodiment of the device (FIG. 4), each pressure probe $S_i$ presents inner and outer end portions PI and PE that are substantially hemispherical and interconnected by a substantially cylindrical shell CQ having its axis of symmetry directed along the arm 2 and of section that is substantially circular. Relative to the central shell CQ, the inner and outer end portions PI and PE are disposed respectively towards the center C and outside the arm 2. FIG. 5 shows the circular section of the shell CQ on section line III-III of FIG. 4.

In a third embodiment, each pressure probe $S_i$ is substantially spherical, such that the device 1 is then represented by FIG. 1 in face view and by FIG. 5 relative to the section III-III in FIG. 1.

For each of these three embodiments, the pressure intakes $P_i$, $Q_i$ of each probe are oriented along a direction intersecting the center of the anterior portion, represented by the center of the semicircle CC (FIGS. 3 and 5) contained in the plane of symmetry orthogonal to the arm, and preferably forming an angle a that lies either in the range 25° to 35° relative to the plane of rotation or in the range 55° to 70° relative to said plane of rotation.

The length 2R of the rotary arm 2 between its two ends is advantageously short, preferably less than 0.2 m. Furthermore, the speed of rotation driven by the motor is kept constant so that the drive speed of each pressure sensor is much greater than the greatest air speed along the trajectory to be measured, and is at least 50 m/s.

Furthermore, the angular position of the arm relative to the frame of reference (x,y,z) is known continuously from a suitable synchronization signal T, formed by a phonic wheel, an angle encoder, or any equivalent means.

Figure 6:
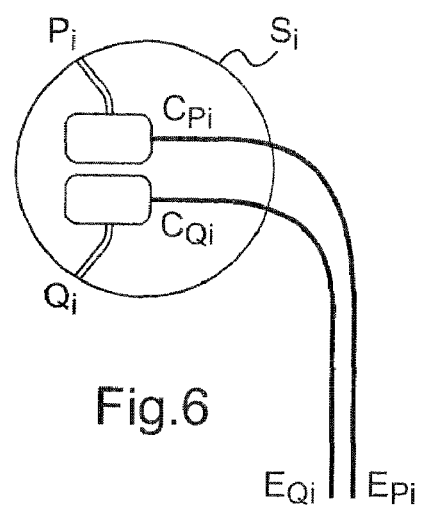
FIG. 6 is a section of a pressure probe according to FIG. 4 or 5, showing how two pressure sensors are implanted.

As shown in FIG. 6, each pressure intake $P_i$ and $Q_i$ is connected pneumatically to a respective miniature pressure sensor $C_{Pi}$ and $C_{Qi}$ located in the corresponding pressure probe $S_i$. Each sensor converts the measured pressure into an electric signal which may be analog or digital. Under such circumstances, the pneumatic connection is obtained by means of a duct that is very short, or indeed directly if the sensor is located at the pressure intake itself.

It should be observed that each sensor $C_{Pi}$ and $C_{Qi}$ measures local pressure under these conditions and that this first disposition corresponds to the first variant of the method implemented by said device. Thus, the pressure sensors $C_{P1}$, $C_{P2}$, $C_{Q1}$, $C_{Q2}$ output respective electric signals referenced $E_{P1}$, $E_{P2}$, $E_{Q1}$, $E_{Q2}$.

A second possibility corresponds to using four pressure sensors respectively referenced $C_{P1P2}$, $C_{P1Q1}$, $C_{P2Q2}$, and $C_{Q1Q2}$ and disposed either all in the central portion formed by the arm and the drive shaft at substantially equal distances from the two pressure probes, or else in such a manner that one pressure sensor is disposed in each pressure probe, with the other two sensors in said central portion. Furthermore, each sensor is connected to the two pressure intakes and thus measures a differential pressure. This second disposition corresponds to the second variant of the method.

In this respect, it can thus be understood that:
the sensor $C_{P1P2}$ measures the differential pressure between the pressure intakes $P_1$ and $P_2$ that is equal to the pressure measured by the pressure intake $P_1$ minus the pressure measured by the pressure intake $P_2$, and then outputs an electric signal $E_{P1P2}$;
the sensor $C_{P1Q1}$ measures the differential pressure between the pressure intakes $P_1$ and $Q_1$ that is equal to the pressure measured by the pressure intake $P_1$ minus the pressure measured by the pressure intake $Q_1$, and then outputs an electric signal $E_{P1Q1}$;
the sensor $C_{P2Q2}$ measures the differential pressure between the pressure intakes $P_2$ and $Q_2$ that is equal to the pressure measured by the pressure intake P2 minus the pressure measured by the pressure intake $Q_2$, and then outputs an electric signal $E_{P2Q2}$;
the sensor $C_{Q1Q2}$ measures the differential pressure between the pressure intakes $Q_1$ and $Q_2$ that is equal to the pressure measured by the pressure intake $Q_1$ minus the pressure measured by the pressure intake $Q_2$, and then outputs an electric signal $E_{Q1Q2}$.

Naturally, the output signal from each sensor varies cyclically with rotation of the arm 2, and may be either analog or digital.

Furthermore, in a first variant of the embodiments of the device 1 suitable for implementing the first variant of the method (FIG. 7), first processor means 5 for processing the electric signals derived from the pressure measurements from the sensors $C_{P1}$, $C_{P2}$, $C_{Q1}$, and $C_{Q2}$ are such that:
a first combiner OC1 calculates a first magnitude S or electric signal S such that:

$$S = E_{P1} + E_{P2} - E_{Q1} - E_{Q2}$$

It can be observed that calculating a signal S of equal absolute value but of sign opposite to that given by the above formula does nothing to change the principle;
a second combiner OC2 calculates a second magnitude D or electric signal D such that:

$$D = E_{P1} + E_{Q1} - E_{P2} - E_{Q2}$$

It can again be observed that calculating a signal D having the same absolute value but of sign opposite to that given by the above formula changes nothing in principle; and
a harmonic analyzer AH receives the signals representing the first and second magnitudes S and D and analyzes said signals into harmonic components relative to a synchronization signal T generated by suitable means SY (phonic wheel, angle encoder, or any other equivalent means).

Preferably, the synchronization signal T corresponds to the beginning of a revolution of the arm 2, identified as being when the arm is in alignment with the reference axis y, for example.

Figure 7:
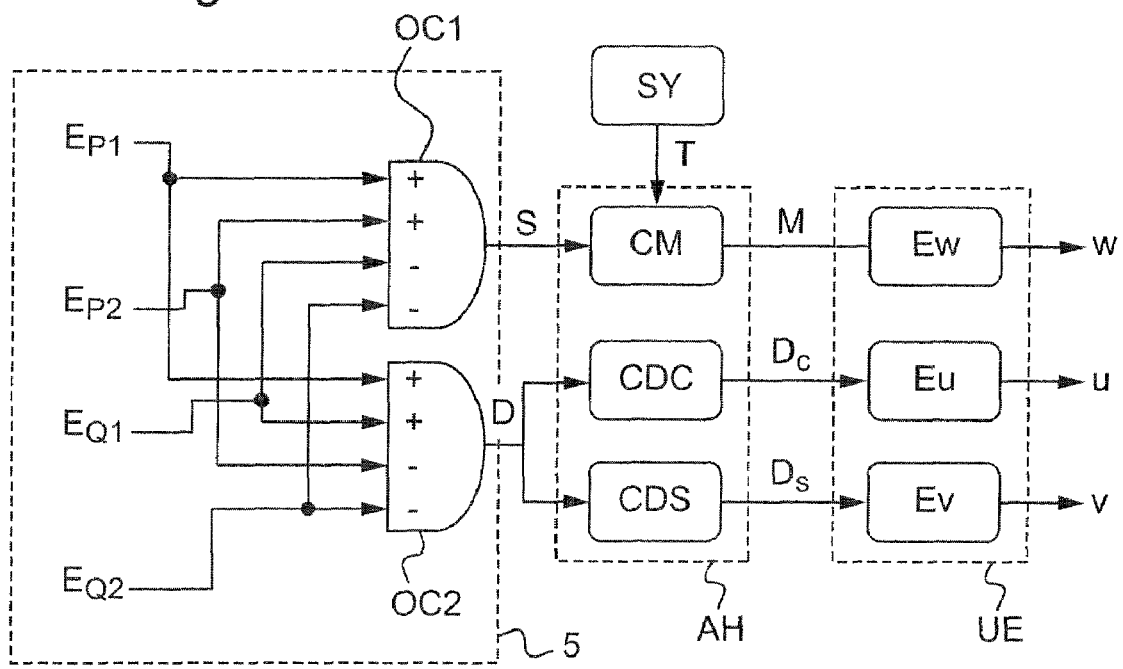
FIG. 7 is a diagram for describing the processing of the electric signals derived from pressure measurement in order to obtain the three components $\underline{u}$, $\underline{v}$, and $\underline{w}$ of the air speed on the path of said device relative to the surrounding air, in a first variant of the method implemented by the device.

An element CM of the harmonic analyzer AH processes the signal S so that the mean component M of this signal as output provides the component w on the basis of knowing the one-to-one relationship between M and w obtained by prior calibration and represented by an element Ew in FIG. 7.

In similar manner, elements CDC and CDS of the harmonic analyzer AH process the signal D so that the elements CDC and CDS respectively generate output signals DC and DS.

These signals DC and DS, corresponding to the harmonic components, respectively the first order components in phase and in phase quadrature for the second magnitude D, provide respectively the components u and v on the basis of knowing the one-to-one relationship between each harmonic component DC and DS and each of the respective components u and v, which relationships are obtained by prior calibration and are represented in FIG. 7 by elements Eu and Ev respectively.

To do this, and with reference to FIG. 9, consideration is given to a local rectangular frame of reference (r,t,z) associated with the probe, the axis t being the tangent to the circle described by said probe, and consequently lying in the plane of rotation PR which also contains the axis r passing through the center C of the circle. It is also considered that the amplitude of the tangential speed TB of the air in register with each pressure intake of a probe $S_i$ is associated solely with the components of the air speed $T_{si}$ relative to said probe $S_i$, i.e., respectively $v_s$ along the t axis, $v_r$ along the r axis, and w along the z axis, by a relationship of the form:

$$TB = v_s * f\left(\frac{w}{v_s}, \frac{v_r}{v_s}\right)$$

where * designates the multiplication sign.

It is important to note that TB is the local speed of the air stream past each pressure intake, and thus tangential to the corresponding probe wall.

Furthermore, the speed $v_s$ is the sum firstly of a speed U due to the speed of rotation $\Omega R$ of the probe $S_i$ such that said air speed U relative to the probe $S_i$ is equal to (-$\Omega R$), and secondly a periodic disturbance $v_t$ which is the projection on the direction of U of the air speed on the trajectory TA at the center of the arm 2. It follows that $v_s = U + v_t$.

The speed $v_r$ that varies periodically is the projection onto the radial direction (r axis) of the speed TA.

The parameters $$\frac{w}{v_s} \text{ and } \frac{v_r}{v_s}$$

are representative of the angles formed by the speed TA respectively with the plane of rotation PR and with the plane (t,z).

Naturally, the components u and v are linked with the components $v_r$ and $v_t$ by the following relationships, where $\bar{t}$ designates time:

$$v_r = -u \sin \Omega \bar{t} - v \cos \Omega \bar{t}$$

$$v_t = u \cos \Omega \bar{t} - v \sin \Omega \bar{t}$$

The function f depends only on the shape of the probe $S_i$ and on the location of the pressure intakes $P_i$ or $Q_i$.

Since the periodic components $v_t$ and $v_r$ and also the constant component w remain relatively small compared with U, the speed TB in register with a pressure intake is approximately equal to:

$$TB = f_0 * (U + v_t) + (f_r' * v_r) + (f_z' * w)$$

This expression is obtained by a Taylor/MacLaurin series expansion of the function f and retains only the first order terms.

Thereafter, given geometrical symmetries, the tangential speeds TB at each of the pressure intakes $P_1$, $Q_1$, $P_2$, and $Q_2$ are expressed respectively as follows:

$$TB_{P1} = f_0 * (U + v_t) + (f_r' * v_r) + (f_z' * w)$$

$$TB_{Q1} = f_0 * (U + v_t) + (f_r' * v_r) - (f_z' * w)$$

$$TB_{P2} = f_0 * (U - v_t) - (f_r' * v_r) + (f_z' * w)$$

$$TB_{Q2} = f_0 * (U - v_t) - (f_r' * v_r) - (f_z' * w)$$

Considering that the flow is of the incompressible, irrotational, and steady type, the speed and the pressure are associated by Bernoulli's theorem. Thus, the total pressure $p_i$ is the same for the intake $P_i$ and for the intake $Q_i$, i.e., with $\rho$ designating the density of air and P the static pressure undisturbed by the presence of the probes:

for the pressure probe $S_1$:

$$p_{i1} = P + \left(\frac{\rho}{2} * T_{S1}^2\right)$$

$$= P_{P1} + \left(\frac{\rho}{2} * \overline{TB_{P1}}^2\right)$$

$$= P_{Q1} + \left(\frac{\rho}{2} * \overline{TB_{Q1}}^2\right)$$

where:
$P_{Pi}$ local pressure at the pressure intake $P_1$,
$P_{Q1}$=local pressure at the pressure intake $Q_1$,
for the second pressure probe $S_2$:

$$p_{i2} = P + \left(\frac{\rho}{2} * T_{S2}^2\right)$$

$$= P_{P2} + \left(\frac{\rho}{2} * \overline{TB_{P2}}^2\right)$$

$$= P_{Q2} + \left(\frac{\rho}{2} * \overline{TB_{Q2}}^2\right)$$

where:
$P_{P2}$=local pressure at the pressure intake $P_2$,
$P_{Q2}$=local pressure at the pressure intake $Q_2$.

Finally, it can be deduced therefrom that the electric signals S and D can be expressed in the form:

$$S = -4\rho f_0 U f_z' w$$

$$D = -4\rho U[(1 - f_0^2) v_t - f_0 f_r' v_r]$$

since the pressures $P_{P1}$, $P_{P2}$, $P_{Q1}$, and $P_{Q2}$ are respectively proportional to the electric signals $E_{P1}$, $E_{P2}$, $E_{Q1}$, and $E_{Q2}$.

From the first expression, the signal S does not vary during rotation of the probe and is directly proportional to the axial component w of the speed, providing the coefficients $f_0$ and $f_z'$ are not zero. To satisfy these two conditions, it is appropriate to ensure that the angle a is not too close to 0° (P and Q pressure intakes close to each other and close to the flow stop point). The zone situated close to the maximum thickness of the section (angle a close to 90°) should also be avoided because the coefficient $f_z'$ is zero therein and because the flow can begin to separate thereat.

From the second above expressions, the signal D varies sinusoidally during rotation of the probe in the same manner as the speed components $v_t$ and $v_r$ from which it depends directly. The components $v_t$ and $v_r$ in the rotary frame of reference (r,t,z) are the projections of the components u and v onto the non-rotary frame of reference (x,y,z).

Thus, and as explained above, the electric signals S and D are analyzed into harmonic components, thus enabling the three components u, v, and w of the air speed on the trajectory TA in the reference frame of reference (x,y,z) to be obtained.

The formulae linking the speed components to the harmonic components of the signals S and D show that atmospheric conditions have an influence on measurement, through the presence of the density $\rho$ of the air as a factor in those formulae.

By way of example, if speed values were to be calculated in those formulae by making use of a reference, arbitrary, and constant value for density (e.g. the density at sea level in an ISA type standard atmosphere equals 1.225 kilograms per cubic meter (kg/m³)) would not be real speeds, but equivalent speeds satisfying the relationship:

$$u_{eq} = \left\{\frac{\rho}{\rho_{ref}}\right\} * u$$

and the same would apply to the components $\underline{v}$ and $\underline{w}$. It should be observed that this equivalence relationship is different form the well-known relationship for conventional Pitot probes, because the pressure intakes are not located on a stationary probe but on an arm rotating at constant speed. Naturally, the formulae can be applied with a density that is calculated on the basis of real temperature and pressure conditions.

It is also important to observe that when, as is usually the case, the device is on board a helicopter having rotors rotating at constant speed, the cyclical variations in pressure on the surfaces of the blades induced by the speed components and the amplitudes of the cyclical movements in pitch and flapping needed for balancing these variations are themselves proportional to the equivalent speeds regardless of the density of the air. The pressure-disturbance mechanism on the rotating blades is entirely analogous to the mechanism observed on the pressure intakes situated on the rotary probes. Consequently, it can be advantageous to make use directly and solely of the equivalent speed information. Nevertheless, if it is necessary to obtain the real speed components, then a relative air density correction can be performed by using measurements of the pressure and the temperature of the atmosphere.

In other words, and without going beyond the ambit of the invention, the three components $\underline{u}$, $\underline{v}$, and $\underline{w}$ of the air speed are obtained on the trajectory TA relating either to reference conditions for which the air density is set at a reference value, or relating to real atmospheric conditions in which the density of the air is calculated on the basis of local conditions of pressure and temperature.

Selecting a probe that is cylindrical in shape in the vicinity of its pressure intakes is advantageous since that ensures that the component $f'_r$ is zero or practically zero, such that the signal D varies in phase with the component $v_t$ and its harmonic analysis synchronized on the rotation of the probe then provides the components $\underline{u}$ and $\underline{v}$ directly, and without coupling, to within a multiplicative scale factor. In this context, it should be observed that the second embodiment, in particular with two pressure intakes located in the midplane of the cylindrical portion, corresponds to the least disturbance by the surrounding air flow, thus ensuring that the coefficient $f'_r$ is practically zero. It presents the advantage of reducing the transverse component of the air flow over the probe, i.e. the component parallel to the arm and not the incident flow on said probe, i.e. perpendicular to the arm. For a probe that is spherical in shape or of some other shape, the coefficient $f'_r$ is not necessarily zero, which will give rise to a certain amount of phase shifting between the maximum in the signal D and the probe facing the direction of the speed vector. This can be compensated by a phase shift in the synchronization signal or by using a rotation matrix applied to the components delivered by the harmonic analysis, where the phase shift needs to be determined during calibration of the probe.

For the signal D to be usable, it is necessary for the coefficient $f_0$ to be neither equal to nor too close to the value 1 so that the expression $(1-f_0^2)$ does not take a value that is too small. That is why it is appropriate to avoid the angle $\underline{a}$ being too close to 45°, since the theory of flow over a cylinder shows that the local speed is equal to $v_r$ when a has the value 45°.

In a second variant of the embodiments of the device 1 enabling a second variant of the method to be implemented (FIG. 8), second processor means 6 for processing the electric signals derived from the differential pressure measurements from the sensors $C_{P1P2}$, $C_{P1Q1}$, $C_{P2Q2}$, and $C_{Q1Q2}$ comprise the following:

a first summing circuit SO1 calculates the first magnitude (or electric signal S) such that:

$$S = E_{P1Q1} + E_{P2Q2}$$

where
$E_{P1Q1} = E_{P1} - E_{Q1}$
$E_{P2Q2} = E_{P2} - E_{Q2}$
a second summing circuit SO2 calculates the second magnitude D (or electric signal D) such that:

$$D = E_{P1P2} + E_{Q1Q2}$$

where:
$E_{P1P2} = E_{P1} - E_{P2}$
$E_{Q1Q2} = E_{Q1} - E_{Q2}$
the harmonic analyzer AH, the synchronizer SY, and the calibration elements $E_w$, $E_u$, and $E_v$ remain identical to those described above for the first variant.

Figure 8:
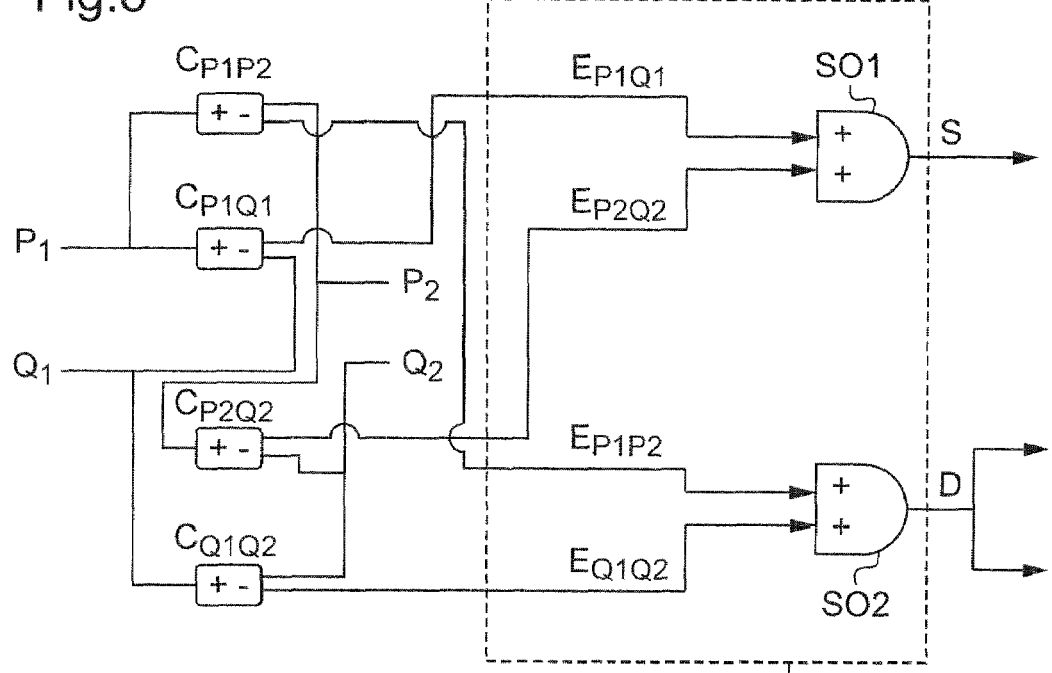
FIG. 8 is a diagram for describing the processing of the electric signals derived from pressure measurement in order to obtain the three components $\underline{u}$, $\underline{v}$, and $\underline{w}$ of the air speed on the path of said device relative to the surrounding air, in a second variant of the method implemented by the device.

The method in accordance with the invention is also shown diagrammatically by FIGS. 7, 8, and 9.

To this end, the method for obtaining the three components $\underline{u}$, $\underline{v}$, $\underline{w}$ of the air speed on the trajectory TA of an aircraft in a non-rotary rectangular frame of reference (x,y,z) is remarkable in that it comprises the following steps:

a) measuring air pressures via at least four pressure intakes $P_1$, $Q_1$, $P_2$, and $Q_2$, a first group of air intakes $P_1$ and $Q_1$, and a second group of air intakes $P_2$ and $Q_2$ being disposed respectively on first and second pressure probes $S_1$ and $S_2$ interconnected by an arm rotating at a constant speed of rotation $\Omega$ about its center C and orthogonally about a drive shaft such that the pressure intakes $P_1$ and $Q_1$ of the first pressure probe $S_1$ and the pressure intakes $P_2$ and $Q_2$ of the second pressure probe $S_2$ are at equal distances R from the center of rotation C of the rotary arm, and furthermore the pressure intakes $P_1$ and $P_2$ are respectively symmetrical with the pressure intakes $Q_1$ and $Q_2$ relative to the plane of rotation PR of said arm;

b) converting the four pressure measurements into four electric signals;

c) establishing a first magnitude S by adding the electric signals obtained from the two pressure intakes $P_1$ and $P_2$ disposed above the plane of rotation PR and subtracting the electric signals obtained from the two pressure intakes $Q_1$ and $Q_2$ disposed below said plane of rotation;

d) establishing a second magnitude D by adding the electric signals obtained from one of the two pressure probes and by subtracting the electric signals obtained from the other pressure probe;

e) using a Taylor/MacLaurin series development of the theoretical expression for the tangential speed TB of the air in register with each pressure intake and retaining only the first order terms so as to obtain firstly a first expression representative of the first magnitude S and secondly a second expression representative of the second magnitude D having the following forms respectively:

$$S = -4\rho f_0 U f'_z w$$

$$D = -4\rho U[(1-f_0^2)v_t - f_0 f'_r v_r]$$

where:

ρ=density of air;
U=the driven speed of the probes in the rotary movement of the arm;
=−ΩR;
$v_s$=U+$v_t$;
$v_r$=the component of TA along an axis r passing through the probes and the center C;
$v_t$=the component of TA along an axis t orthogonal to the axis r and in the plane PR $$TB = v_s * f\left(\frac{w}{v_s}, \frac{v_r}{v_s}\right)$$

$f_0$=the first term of the Taylor/MacLaurin series development of the function f;
$f'_r$=the partial derivative of f relative to r;
$f'_z$=the partial derivative of f relative to z;

f) since the first expression S is proportional to w, and since the other terms are known, deducing w therefrom by identifying said first expression S with the first magnitude S, said operation being performed by harmonic analysis synchronized on the speed of rotation of the arm from a synchronization signal T such that the mean component M of the first magnitude S provides w on the basis of knowledge of the one-to-one relationship between said mean component M and w as obtained by prior calibration; and g) since the second expression D is a periodic function of time due to the constant speed of rotation Ω of the arm and depends on two periodic components $v_t$ and $v_r$ of the air speed along the trajectory in two orthogonal axes, respectively t and r linked with a probe, contained in said plane of rotation and respectively normal and radial relative to said arm, producing, by said harmonic analysis synchronized on the speed of rotation of the arm, the first order harmonic components DC and DS of the second magnitude D, and consequently the components u and v as a function of previously established corresponding calibration.

Furthermore, in a first variant of the method (FIG. 6), steps b), c), and d) are performed as follows:

an electric signal $E_{P1}$ generated by a pressure sensor $C_{P1}$ associated with the pressure intake $P_1$ is transmitted to two combiner members OC1 and OC2 and is given a positive sign;

an electric signal $E_{P2}$ generated by a pressure sensor $C_{P2}$ associated with the pressure sensor $P_2$ is transmitted firstly to the combiner member OC1 and associated with a positive sign, and secondly to the combiner member OC2 and associated with a negative sign;

an electric signal $E_{Q1}$ generated by a pressure sensor $C_{Q1}$ associated with the pressure intake $Q_1$ is transmitted firstly to the combiner member OC1 and is associated with a negative sign, and secondly to the combiner member OC2 and is associated with a positive sign;

the electric signal $E_{Q2}$ generated by the pressure sensor $C_{Q2}$ associated with the pressure intake $Q_2$ is transmitted to both combiner members OC1 and OC2 and is associated with a negative sign;

the first magnitude S is established by the first combiner OC1 summing the electric signals; and the second magnitude D is established by the second combiner member OC2 by summing the electric signals.

In a second variant of the method, also shown by FIG. 7, steps b), c), and d) are formed as follows:

the pressures of the pressure intakes $P_1$ and $P_2$ are transmitted to a pressure sensor $C_{P1P2}$ that measures a differential pressure equal to the pressure measured by the pressure intake $P_1$ minus the pressure measured by the pressure intake $P_2$, and converted into an electric signal $E_{P1P2}$;

the pressures of the pressure intakes $P_1$ and $Q_1$ are transmitted to a pressure sensor $C_{P1Q1}$ that measures a differential pressure equal to the pressure measured by the pressure intake $P_1$ minus the pressure measured by the pressure intake $Q_1$, and converted into an electric signal $E_{P1Q1}$;

the pressures of the pressure intakes $P_2$ and $Q_2$ are transmitted to a pressure sensor $C_{P2Q2}$ that measures a differential pressure equal to the pressure measured by the pressure intake $P_2$ minus the pressure measured by the pressure intake $Q_2$, and converted into an electric signal $E_{P2Q2}$; and the pressures of the pressure intakes $Q_1$ and $Q_2$ are transmitted to a pressure sensor $C_{Q1Q2}$ that measures a differential pressure equal to the pressure measured by the pressure intake $Q_1$ minus the pressure measured by the pressure intake $Q_2$, and converted into an electric signal $E_{Q1Q2}$.

Under such conditions, the following are obtained:

the signal having the first magnitude S by adding the signals $E_{P1Q1}$ and $E_{P2Q2}$ in a first summing circuit SO1; and the signal having the second magnitude D by adding the signals $E_{P1P2}$ and $E_{Q1Q2}$ in a second summing circuit SO2.

In the event of there being any phase shift, as determined during calibration of a probe, between the probe facing the direction of the speed vector and the maximum value of the signal having the second magnitude D, this effect is compensated by shifting the phase of the synchronization signal T.

In likewise advantageous manner, this phase shift can be compensated by using a rotation matrix applied to the components delivered by the harmonic analysis.

In this way, the device 1 and the associated method satisfy the needs of the user, in particular by having almost constant sensitivity regardless of the speed of the device relative to the air and thus regardless of this speed of the aircraft fitted therewith, and this applies to all three components u, v, and w.

The device is also remarkably simple since it requires only four pressure sensors, integrated as close as possible to the pressure intakes.

Calibration is simplified since the three components u, v, and w are separated, such that linear calibration will usually suffice.

Naturally, the present invention can be varied in numerous ways as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of obtaining the three components u, v, and w of the air speed along a trajectory TA of an aircraft in a non-rotary rectangular frame of reference (x,y,z), characterized by the following steps:

a) measuring air pressures via at least four pressure intakes $P_1$, $Q_1$, $P_2$, and $Q_2$, a first group of air intakes $P_1$ and $Q_1$, and a second group of air intakes $P_2$ and $Q_2$ being disposed respectively on first and second pressure probes $S_1$ and $S_2$ interconnected by an arm (2) rotating at a constant speed of rotation Ω about its center C and orthogonally about a drive shaft (3) such that the pressure intakes $P_1$ and $Q_1$ of the first pressure probe $S_1$ and the pressure intakes $P_2$ and $Q_2$ of the second pressure probe $S_2$ are at equal distances R from the center of rotation C of the rotary arm, and furthermore the pressure intakes $P_1$ and $P_2$ are respectively symmetrical with the pressure intakes $Q_1$ and $Q_2$ relative to the plane of rotation PR of said arm (2);

b) converting the four pressure measurements into four electric signals;

c) establishing a first magnitude S by adding the electric signals obtained from the two pressure intakes $P_1$ and $P_2$ disposed above the plane of rotation PR and subtracting the electric signals obtained from the two pressure intakes $Q_1$ and $Q_2$ disposed below said plane of rotation;

d) establishing a second magnitude D by adding the electric signals obtained from one of the two pressure probes and by subtracting the electric signals obtained from the other pressure probe;

e) using a Taylor/MacLaurin series development of the theoretical expression for the tangential speed TB of the air in register with each pressure intake and retaining only the first order terms so as to obtain firstly a first expression representative of the first magnitude S and secondly a second expression representative of the second magnitude D having the following forms respectively:

$$S = -4\rho f_0 U f_z' w$$

$$D = -4\rho U[(1-f_0^2)v_{t-f_r}' v_r]$$

where:
$\rho$ = density of air;
U = the driven speed of the probes in the rotary movement of the arm (2)
= $-\Omega R$;
$v_s = U + v_t$;
$v_r$ = the component of TA along an axis r passing through the probes and the center C;
$v_t$ = the component of TA along an axis t orthogonal to the axis r and in the plane PR $$TB = v_s * f\left(\frac{w}{v_s}, \frac{v_r}{v_s}\right)$$

$f_0$ = the first term of the Taylor/MacLaurin series development of the function f;
$f_r'$ = the partial derivative of f relative to r;
$f_z'$ = the partial derivative of f relative to z;

f) since the first expression S is proportional to w, and since the other terms are known, deducing w therefrom by identifying said first expression S with the first magnitude S, said operation being performed by harmonic analysis synchronized on the speed of rotation of the arm (2) from a synchronization signal T such that the mean component M of the first magnitude S provides w on the basis of knowledge of the one-to-one relationship between said mean component M and w as obtained by prior calibration; and g) since the second expression D is a periodic function of time due to the constant speed of rotation $\Omega$ of the arm and depends on two periodic components $v_t$ and $V_r$ of the air speed along the trajectory in two orthogonal axes, respectively t and r linked with a probe, contained in said plane of rotation and respectively normal and radial relative to said arm (2), producing, by said harmonic analysis synchronized on the speed of rotation of the arm, the first order harmonic components DC and DS of the second magnitude D, and consequently the components u and v as a function of previously established corresponding calibration.

2. A method according to claim 1, wherein steps b), c), and d) are performed as follows:

an electric signal $E_{p1}$ generated by a pressure sensor $C_{p1}$ associated with the pressure intake $P_1$ is transmitted to two combiner members OC1 and OC2 and is given a positive sign;

an electric signal $E_{p2}$ generated by a pressure sensor $C_{p2}$ associated with the pressure sensor $P_2$ is transmitted firstly to the combiner member OC1 and associated with a positive sign, and secondly to the combiner member OC2 and associated with a negative sign;

an electric signal $E_{Q1}$ generated by a pressure sensor $C_{Q1}$ associated with the pressure intake $Q_1$ is transmitted firstly to the combiner member OC1 and is associated with a negative sign, and secondly to the combiner member OC2 and is associated with a positive sign;

the electric signal $E_{Q2}$ generated by the pressure sensor $C_{Q2}$ associated with the pressure intake $Q_2$ is transmitted to both combiner members OC1 and OC2 and is associated with a negative sign;

the first magnitude S is established by the first combiner OC1 summing the electric signals; and the second magnitude D is established by the second combiner member OC2 by summing the electric signals.

3. A method according to claim 1 wherein the steps b), c), and d), are performed as follows:

the pressures of the pressure intakes $P_1$ and $P_2$ are transmitted to a pressure sensor $c_{P1P2}$ that measures a differential pressure equal to the pressure measured by the pressure intake $P_1$ minus the pressure measured by the pressure intake $P_2$ and converted into an electric signal $E_{P1P2}$ the pressures of the pressure intakes $P_1$ and $Q_1$ are transmitted to a pressure sensor $C_{P1Q1}$ that measures a differential pressure equal to the pressure measured by the pressure intake $P_1$ minus the pressure measured by the pressure intake $Q_1$ and converted into an electric signal $E_{P1Q1}$ the pressures of the pressure intakes $P_2$ and $Q_2$ are transmitted to a pressure sensor $C_{P2Q2}$ that measures a differential pressure equal to the pressure measured by the pressure intake $P_2$ minus the pressure measured by the pressure intake $Q_2$, and converted into an electric signal $E_{P2Q2}$; and the pressures of the pressure intakes $Q_1$ and $Q_2$ are transmitted to a pressure sensor $C_{Q1Q2}$ that measures a differential pressure equal to the pressure measured by the pressure intake $Q_1$ minus the pressure measured by the pressure intake $Q_2$ and converted into an electric signal $E_{Q1Q2}$ the signal for the first magnitude S is obtained by a first summing circuit SO1 adding the signals $E_{P1Q1}$ and $E_{P2Q2}$ ; and the signal for the second magnitude D is obtained by a second summing circuit SO2 adding the signals $E_{P1P2}$ and $E_{Q1Q2}$.

4. A method according to claim 1, wherein the electric signals are analog signals.

5. A method according to claim 1, wherein the electric signals are digital signals.

6. A method according to claim 1, wherein the synchronization signal T is generated by a phonic wheel.

7. A method according to claim 1, wherein the synchronization signal T is generated by an angle encoder.

8. A method according to claim 1, wherein a phase shift between the maximum value of the signal for the second magnitude and a probe facing the speed direction, as determined during calibration of a probe, is compensated by shifting the phase of the synchronization signal T.

9. A method according to claim 1, wherein a phase shift between the maximum value of the signal for the second magnitude and a probe facing the speed direction, as determined during calibration of a probe, is compensated by using a rotation matrix applied to the components provided by the harmonic analysis.

10. A device (1) for implementing the method specified by claim 1, the device comprising:
   an arm (2) orthogonal at its center C to a drive shaft (3) directed along the z axis, rotating at a constant speed of rotation Ω in a plane of rotation PR;
   two pressure probes $S_1$ and $S_2$ disposed, one at one end of the arm (2) and the other at the opposite end of said arm (2);
   four pressure intakes $P_i$ and $Q_i$ such that two pressure intakes $P_1$ and $Q_1$ are disposed on the pressure probe $S_1$ and two pressure intakes $P_2$ and $Q_2$ are disposed on the pressure probe $S_2$, the pressure probes $P_i$ and $Q_i$ of any one probe being symmetrical about the plane of rotation PR, being respectively above and below said plane of rotation PR;
   four pressure sensors [($C_{P1}$, $C_{P2}$, $C_{Q1}$, $C_{Q2}$), ($C_{P1P2}C_{P1Q1}C_{P2Q2},C_{Q1Q2}$)], each pressure sensor being associated with at least one pressure intake, converting pressure measurements into electric signals;
   processor means (5,6) for processing the electric signals generated by the four pressure sensors to establish a first magnitude S and a second magnitude D;
   a harmonic analyzer AH coupled to a synchronizer SY delivering a synchronization signal T, firstly so that the processing of the signal S relating to the first magnitude by an element CM provides an output signal M, and secondly the processing of the signal relating to the second magnitude D by elements CDC and CDS provides respectively two output signals DC and DS, the signals M, DC, and DS corresponding to the harmonic components respectively of the mean component of the first magnitude S, and the first order components in phase and in phase quadrature of the second magnitude D; and
   a calibration unit UE enabling the components u, v, and w of TA to be obtained in a non-rotary rectangular frame of reference (x,y,z), the value M providing w from knowledge of the one-to-one relationship between M and w as obtained by prior calibration, and the values DC and D respectively providing the components u and v on the basis of knowledge of one-to-one relationships obtained by prior calibration between DC and u, and between DS and v.

11. A device (1) according to claim 10, wherein each pressure probe $S_1$ and $S_2$ is symmetrical about the plane of rotation PR of said arm (2) with a streamlined anterior end portion situated on the advance side of the arm (2).

12. A device (1) according to claim 11, wherein each probe $S_1$ and $S_2$ is substantially cylindrical.

13. A device (1) according to claim 12, wherein each pressure probe $S_1$ and $S_2$ presents anterior and posterior portions PA and PP that are substantially hemispherical and interconnected by a substantially cylindrical central shell CQ having its axis of symmetry orthogonal to said arm (2) and contained in the plane of rotation PR, and having a section that is substantially circular.

14. A device (1) according to claim 12, wherein each pressure probe $S_1$ and $S_2$ presents inner and outer end portions PT and PE that are substantially hemispherical and interconnected by a shell CQ that is substantially cylindrical, having its axis of symmetry directed along the arm (2), with the inner and outer end portions PT and PE being disposed respectively towards the center C and the outside of the arm (2) relative to the central shell CQ.

15. A device (1) according to claim 11, wherein each pressure probe $S_1$ and $S_2$ is substantially spherical.

16. A device (1) according to claim 15, wherein the pressure intakes $P_i$ and $Q_i$ are oriented along a direction making an angle a lying in the range 25° to 35° relative to the plane of rotation PR.

17. A device (1) according to claim 15, wherein the pressure intakes $P_i$ and $Q_i$ are oriented along a direction making an angle a lying in the range 55° to 70° relative to the plane of rotation PR.

18. A device (1) according to claim 10, wherein each pressure sensor $C_{P1}$, $C_{P2}$, $C_{Q1}C_{Q2}$, is disposed directly at a respective pressure intake $P_1, P_2, Q_1, Q_2$, measures an absolute pressure, and delivers a respective electric signal $E_{P1}, E_{P2}$, $E_{Q1}$, $E_{Q2}$, that is an analog signal or a digital signal.

19. A device (1) according to claim 18, wherein the processor means (5) comprise a first combiner member OC1 that calculates the first magnitude S (electric signal S) such that:
$S=E_{P1}+E_{P2}-E_{Q1}-E_{Q2}$.

20. A device (1) according to claim 10, wherein each pressure sensor $C_{P1}, C_{P2}, C_{Q1}, C_{Q2}$, is pneumatically connected to a respective pressure intake $P_1, P_2, Q_1, Q_2$, measures absolute pressure, and delivers a respective electric signal $E_{P1} E_{P2} E_{Q1} E_{Q2}$ that may be an analog signal or a digital signal.

21. A device (1) according to claim 10, wherein each pressure sensor $C_{P1P2}C_{P1Q1}C_{P2Q2}C_{Q1Q2}$ is connected to two pressure intakes, respectively $P_1$ & $P_2, P_1$ & $Q_2, P_2$ & $Q_1, Q_1$ & $Q_2$, measures a differential pressure, and delivers a respective electric signal $E_{P1P2}E_{P1Q1}E_{P2Q2}E_{Q1Q2}$. and a second combiner member OC2 that calculates the second magnitude D (electric signal D) such that:
$D=E_{P1}+E_{Q1}-E_{P2}-E_{Q2}$.

22. A device (1) according to claim 21, wherein the processor means (5) comprise a first summing circuit SO1 that calculates the first magnitude S (electric signal S) such that:

$S=E_{P1Q1+EP2Q2}$ and a second summing circuit SO2 that calculates the second magnitude D (electric signal D) such that:

$D=E_{P1P2}+E_{Q1Q2}$.

23. A device (1) according to claim 10, wherein the length 2R of the arm (2) is preferably shorter than 0.2 m.

24. A device (1) according to claim 10, wherein the synchronization signal T is generated by a phonic wheel.

25. A device (1) according to claim 10, wherein the synchronization signal T is generated by an angle encoder.

26. An aircraft, being fitted with the device (1) of claim 10.

* * * * *